US012460559B2

(12) United States Patent
Binek et al.

(10) Patent No.: US 12,460,559 B2
(45) Date of Patent: Nov. 4, 2025

(54) SUPPORT STRUCTURE AND SPRING FOR BEARING COMPARTMENT

(71) Applicant: RTX Corporation, Farmington, CT (US)

(72) Inventors: Lawrence A. Binek, Glastonbury, CT (US); Christopher D. Ramsey, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 196 days.

(21) Appl. No.: 18/498,325

(22) Filed: Oct. 31, 2023

(65) Prior Publication Data

US 2024/0151272 A1     May 9, 2024

Related U.S. Application Data

(60) Provisional application No. 63/423,306, filed on Nov. 7, 2022.

(51) Int. Cl.

| *F01D 25/16* | (2006.01) |
|---|---|
| *B22F 5/00* | (2006.01) |
| *B33Y 10/00* | (2015.01) |
| *B33Y 80/00* | (2015.01) |
| *F01D 25/28* | (2006.01) |
| *F16C 27/00* | (2006.01) |

(52) U.S. Cl.
CPC ............ *F01D 25/164* (2013.01); *B22F 5/009* (2013.01); *B33Y 10/00* (2014.12); *B33Y 80/00* (2014.12); *F01D 25/285* (2013.01); *F16C 27/00* (2013.01); *F05D 2230/30* (2013.01); *F05D 2230/31* (2013.01); *F16C 2220/24* (2013.01); *F16C 2220/60* (2013.01); *F16C 2360/23* (2013.01)

(58) Field of Classification Search
CPC .......... F16C 27/00; F16C 27/02; F16C 27/04; F16C 2220/24; F16C 2220/60; F16C 2360/23; B33Y 10/00; B33Y 80/00; B05F 5/009; F05D 2230/30; F05D 2230/31; F01D 25/164; F01D 25/285
See application file for complete search history.

(56) References Cited

U.S. PATENT DOCUMENTS 9,500,230 B2   11/2016   Hiller et al.
9,850,814 B2   12/2017   Grogg
(Continued)

FOREIGN PATENT DOCUMENTS

CN    114483801 A    5/2022
DE    102020206588 A1    6/2021
(Continued)

OTHER PUBLICATIONS

EP Search Report Issued Mar. 19, 2024 in U421887EP, 8 pages.

*Primary Examiner* — Phillip A Johnson
(74) *Attorney, Agent, or Firm* — CANTOR COLBURN LLP (57) ABSTRACT

A bearing compartment includes a housing having an upper housing portion and a lower housing portion, and a support structure fabricated within the bearing compartment. The support structure includes an upper portion within the upper housing portion and a spring section within the lower housing portion. The spring section includes a plurality of struts and is separable from the support structure for use as a spring within the housing.

20 Claims, 6 Drawing Sheets

(56) References Cited

U.S. PATENT DOCUMENTS

| | | | |
|---|---|---|---|
| 9,869,205 B2 | 1/2018 | Ganiger et al. | |
| 10,458,277 B1 | 10/2019 | Von Berg | |
| 10,480,572 B2 | 11/2019 | Smedresman et al. | |
| 10,883,539 B1 * | 1/2021 | Hidalgo | F16C 27/045 |
| 11,313,248 B2 | 4/2022 | Demitraszek, Sr. | |
| 2020/0088408 A1 * | 3/2020 | Binek | F23R 3/002 |
| 2021/0008624 A1 | 1/2021 | Ovaere et al. | |
| 2021/0016498 A1 | 1/2021 | Ovaere et al. | |
| 2021/0062679 A1 | 3/2021 | Marquie et al. | |
| 2022/0010688 A1 * | 1/2022 | Servant | F01D 21/045 |

FOREIGN PATENT DOCUMENTS

| | | | |
|---|---|---|---|
| EP | 3929408 A1 | 12/2021 | |
| FR | 3108687 A1 * | 10/2021 | F16C 27/045 |

* cited by examiner

SUPPORT STRUCTURE AND SPRING FOR BEARING COMPARTMENT

CROSS-REFERENCE TO RELATED APPLICATIONS

This application claims the benefit of U.S. Provisional Application No. 63/423,306 filed Nov. 7, 2022, the disclosure of which is incorporated herein by reference in its entirety.

BACKGROUND

Exemplary embodiments of the present disclosure relate generally to gas turbine engines and, in one embodiment, to a spring formed from a support structure in a bearing compartment of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotation of a propeller/fan or to produce electricity in a generator.

Certain parts, such as a bearing compartment, in a gas turbine engine can include complex geometry. For example, a bearing compartment may include multiple overhang regions that have different radial dimensions. When components are created through an additive manufacturing process, such as through powder bed fusion, support structures are needed to support overhangs and other features having complex geometry. The support structures can be designed by modeling tools to include minimum support for later removal. The suggestions generated by tools are based on component geometry and do not consider the use or assembly aspects of the component.

BRIEF DESCRIPTION

According to an aspect, a bearing compartment includes a housing having an upper housing portion and a lower housing portion, and a support structure fabricated within the bearing compartment. The support structure includes an upper portion within the upper housing portion and a spring section within the lower housing portion. The spring section includes a plurality of struts and is separable from the support structure for use as a spring within the housing.

In addition to one or more of the features described above or below, or as an alternative, further embodiments may include where the spring portion is a squirrel cage spring.

In addition to one or more of the features described above or below, or as an alternative, further embodiments may include where the spring portion includes a shell with an internal lattice structure within the struts.

In addition to one or more of the features described above or below, or as an alternative, further embodiments may include where the shell includes one of more weep holes that allow additive manufacturing powder to be removed from within the internal lattice structure.

In addition to one or more of the features described above or below, or as an alternative, further embodiments may include where the internal lattice structure is a triply periodic minimal surfaces structure as a gyroid.

In addition to one or more of the features described above or below, or as an alternative, further embodiments may include where two or more of the struts are canted.

In addition to one or more of the features described above or below, or as an alternative, further embodiments may include where the spring portion includes one or more features configured to be machined away to tune spring performance of the spring portion.

In addition to one or more of the features described above or below, or as an alternative, further embodiments may include where the spring portion and the upper portion of the support structure are coupled by a sidewall support.

In addition to one or more of the features described above or below, or as an alternative, further embodiments may include where the support structure is integrally formed with the bearing compartment.

In addition to one or more of the features described above or below, or as an alternative, further embodiments may include where the upper portion of the support structure includes a plurality of support struts that provide an inner support for the upper housing portion.

According to an aspect, a method of manufacturing a bearing compartment includes additively manufacturing a spring portion of a support structure within a lower housing portion of the bearing compartment and additively manufacturing an upper portion of the support structure within an upper housing portion of the bearing compartment. The spring portion and the upper portion of the support structure are coupled by a sidewall support, and the support structure is integrally formed with the bearing compartment. The method also includes machining the support structure to separate the spring portion from the support structure and machining the support structure to remove the upper portion from the bearing compartment.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
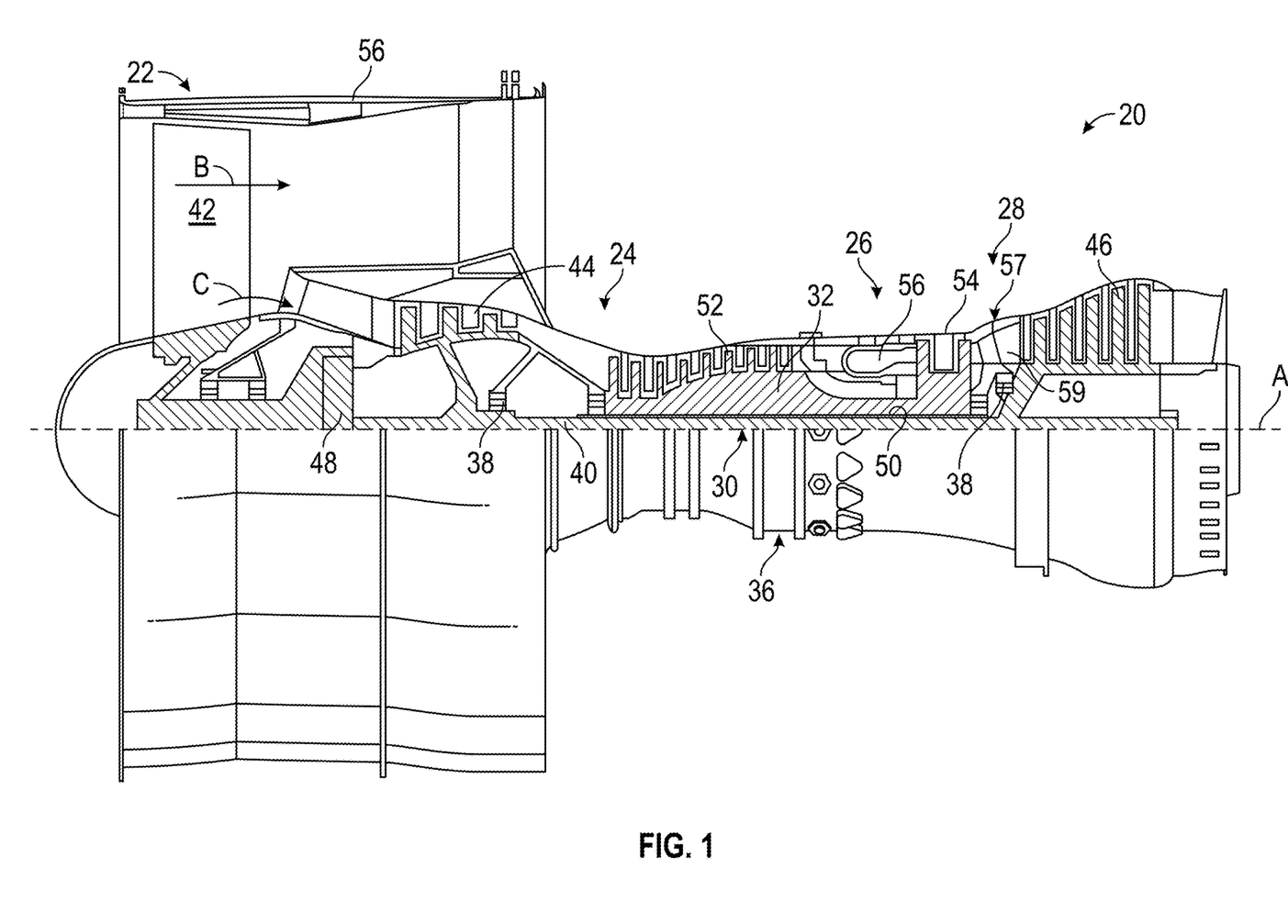
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
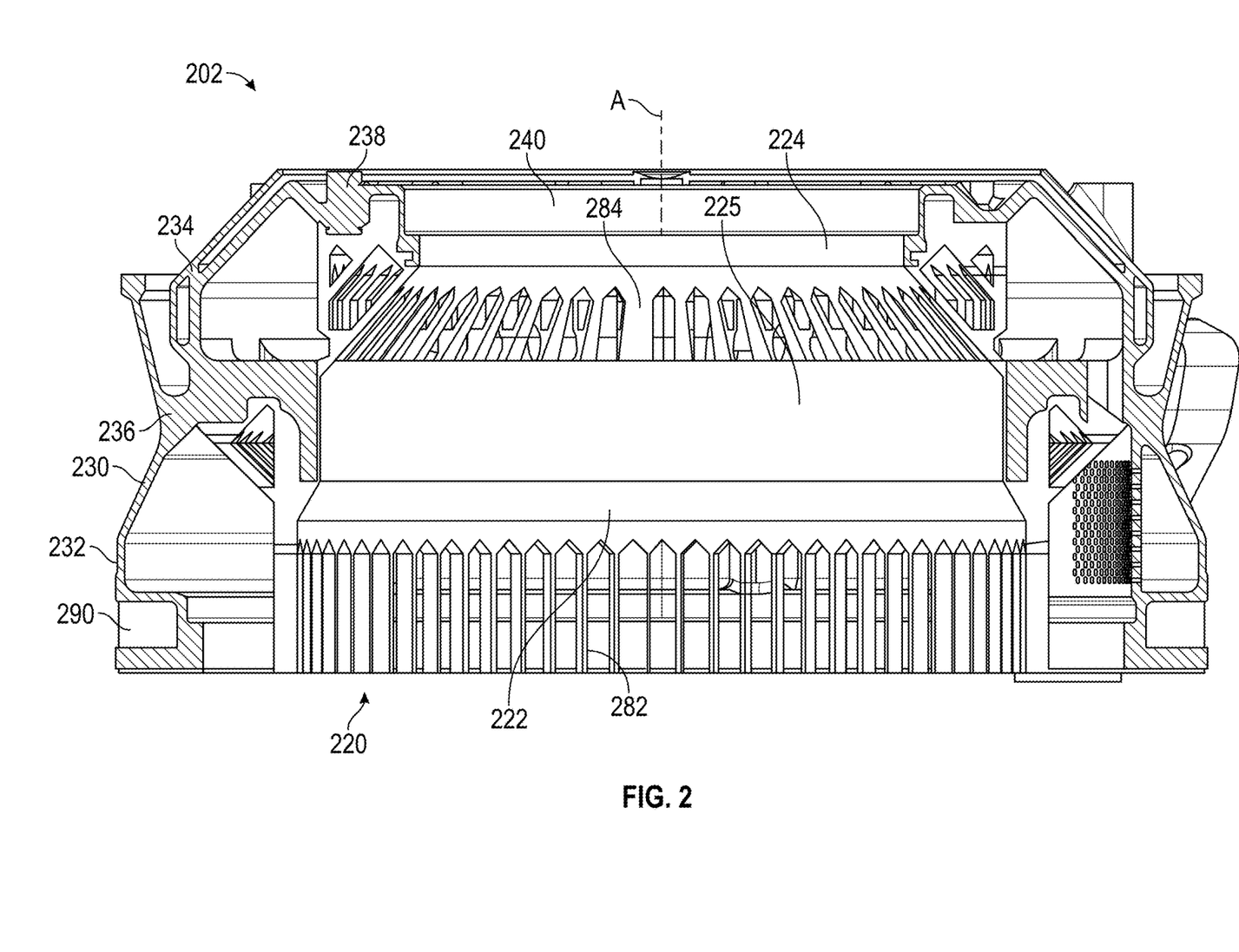
FIG. 2 is a side view of a bearing compartment with a support structure in accordance with embodiments.

With continued reference to FIG. 1 and with additional reference to FIGS. 2-7, a bearing compartment 202 of the gas turbine engine 20 of FIG. 1 can be additively manufactured and include a number of features with a complex geometry. The bearing compartment 202 can be part of the bearing systems 38 to support rotation of one or more shafts, such as the inner shaft 40 or the outer shaft 50. In the example of FIG. 2, the bearing compartment 202 includes a housing 230. The housing 230 can include a lower housing portion 232 and an upper housing portion 234. Rather than separately manufacturing the lower housing portion 232 and the upper housing portion 234, the housing 230 can be monolithically formed through an additive manufacturing process.

A first overhang region 236 that is supported by a support structure 220 during an additive manufacturing build process can be formed between the lower housing portion 232 and the upper housing portion 234. A second overhang region 238 of the upper housing portion 234 can be supported by the support structure 220 during the additive manufacturing build process. The support structure 220 can include a spring portion 222 (also referred to as lower portion 222) in contact with the first overhang region 236 and an upper portion 224 that extends from the first overhang region 236 to the second overhang region 238 that is radially inward of the first overhang region 236. A sidewall support 225 connects the spring portion 222 to the upper portion 224 of the support structure 220. The bearing compartment 202 can be manufactured using a powder bed fusion process, e.g., laser or electron beam based, to progressively build the housing 230 from the lower housing portion 232 to the upper housing portion 234 while also building the support structure 220 within an interior of the housing 230. Forming the support structure 220 integrally with the housing 230 can enhance structural stability as vertical and horizontal support extends to multiple locations within the housing 230.

The spring portion 222 of the support structure 220 can include a plurality of struts 282 that extend axially within the housing 230. The struts 282 can provide the vertical support. The struts 282 can extend axially in parallel to an axis of rotation (e.g., engine central longitudinal axis A) defined within a central cavity 240 of the bearing compartment 202. The upper portion 224 of the support structure 220 can include a plurality of support struts 284 that provide an inner support for the upper housing portion 234.

Other support structures can also be incorporated into the housing 230. For example, an outer support structure 290 can be integrally formed at an outer diameter of the housing 230. The outer support structure 290 may include one or more features to support machining of the bearing compartment 202. For example, the outer support structure 290 may provide a clamping location to hold the bearing compartment 202 during processing to avoid damaging surfaces of the housing 230.

Figure 3:
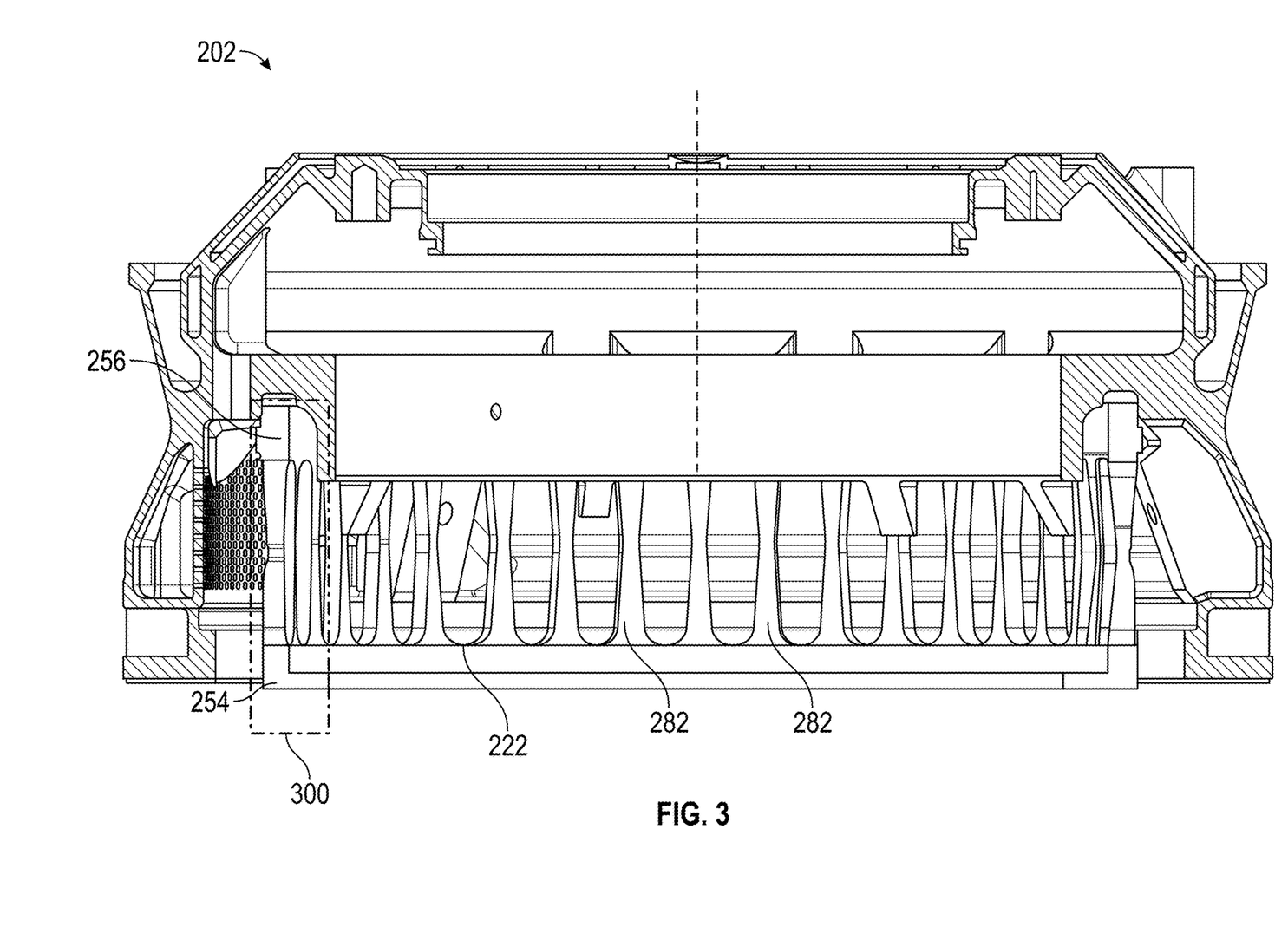
FIG. 3 is a side view of a bearing compartment with a spring in accordance with embodiments.

FIG. 3 is a side view of the bearing compartment 202 with the spring portion 222 separated from the support structure 220 of FIG. 2 in accordance with embodiments. A machining process can be used to separate the spring portion 222 from the support structure 220 and remove the upper portion 224 and sidewall support 225 of FIG. 2. The spring portion 222 can be a squirrel cage spring, where the struts 282 can extend between a first annular support member 254 (e.g., a lower support) and a second annular support member 256 (e.g., an upper support). Part of the machining process to separate the spring portion 222 from the support structure 220 can include machining portions of the struts 282, the first annular support member 254, and/or the second annular support member 256 to tune the structure to provide the desired spring stiffness and/or other parameters.

Figure 4:
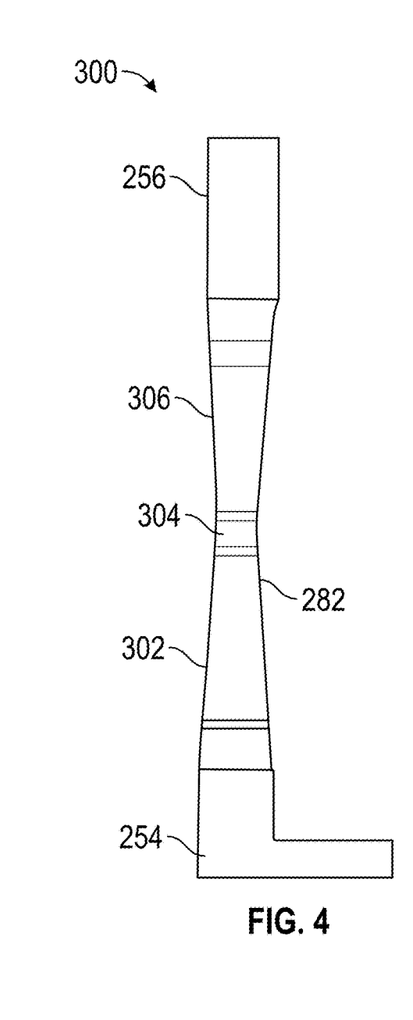
FIG. 4 is an enlarged view of the portion of FIG. 3 in accordance with embodiments.

FIG. 4 depicts additional aspects of a portion 300 of the spring portion 222 of FIG. 3 to better illustrate a strut 282 between the first annular support member 254 and the second annular support member 256. The body of the strut 282 can be canted such the cross-sectional area of the strut 282 decreases when transitioning from the first annular support member 254 through a lower portion 302 of the strut 282 to a central portion 304 of the strut 282. The cross-sectional area of the strut 282 can increase when transitioning from the central portion 304 through an upper portion 306 of the strut to the second annular support member 256. This tapering or canting can be designed to provide a desired amount of damping such that the spring portion 222 is configured to deform in response to a force with a predetermined amount of deflection.

Figure 5:
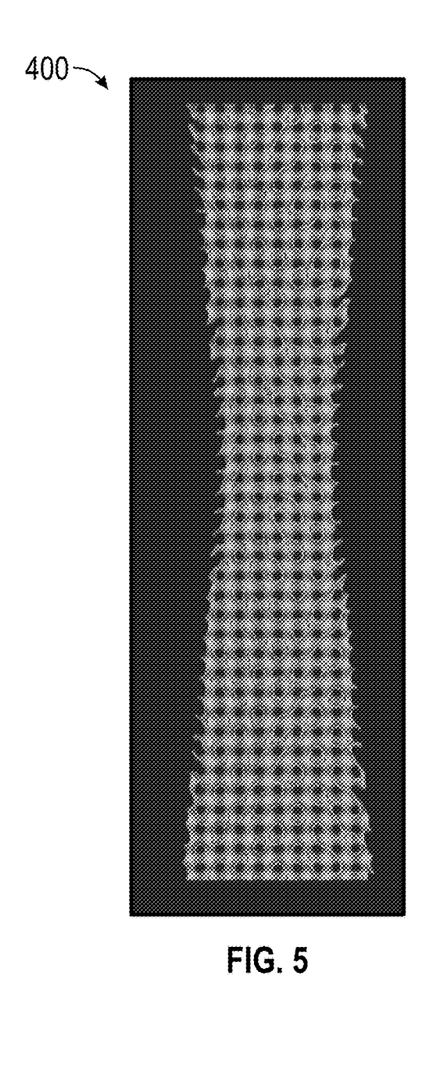
FIG. 5 depicts an example of a triply periodic minimal surfaces structure that can be formed in a spring strut in accordance with embodiments.
Figure 6:
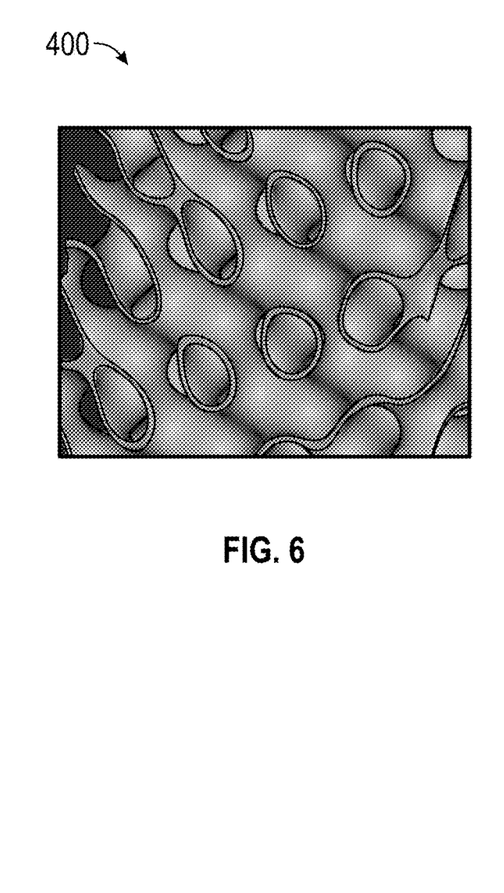
FIG. 6 is a detailed view of the structure of FIG. 5 in accordance with embodiments.

In accordance with embodiments and as shown in FIGS. 5 and 6, the interior of the struts 282 can be designed with an internal lattice structure 400. For instance, as seen in FIG. 4 an outer portion or shell of the strut 282 can be solid, while an interior portion of the strut 282 can have the internal lattice structure 400. The internal lattice structure 400 can be designed to provide a desired amount of stiffness while also reducing the weight of each strut 282 as compared to an embodiment of a solid strut. In embodiments, the internal lattice structure 400 can be a triply periodic minimal surfaces structure comprising a gyroid, e.g., an infinitely connected triply periodic minimal surface.

Figure 7:
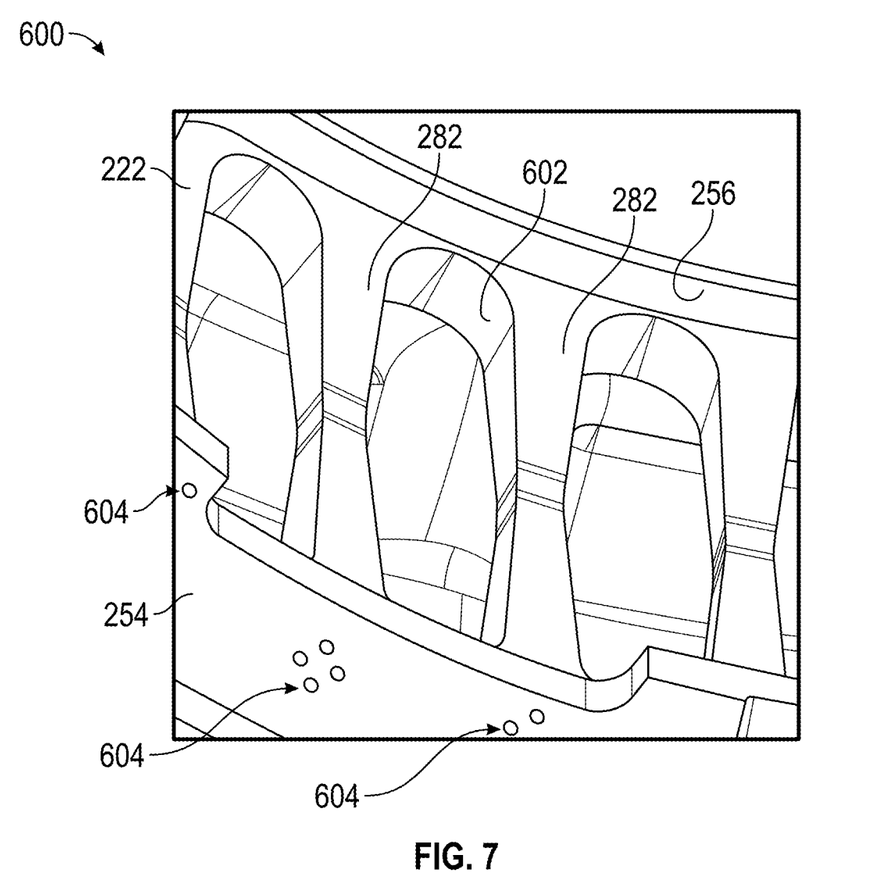
FIG. 7 is a perspective view of a portion of the spring of FIG. 3 in accordance with embodiments.

FIG. 7 is a perspective view of a portion 600 of the spring portion 222 of FIG. 3 in accordance with embodiments. In the example of FIG. 7, a blending radius 602 is illustrated between a pair of struts 282 proximate to the second annular support member 256. The blending radius 602 radius can be determined to minimize an unsupported area between the struts 282. The example of FIG. 7 also depicts weep holes 604 that can be incorporated into the shell of the spring portion 222 to allow additive manufacturing powder to be removed from within the internal lattice structure 400. Although the weep holes 604 are depicted in the first annular support member 254, the weep holes 604 can be placed anywhere on the spring portion 222 to assist in powder removal where non-solid structures are formed within the spring portion 222. Where the spring portion 222 is a solid structure, the weep holes 604 can be omitted.

Figure 8:
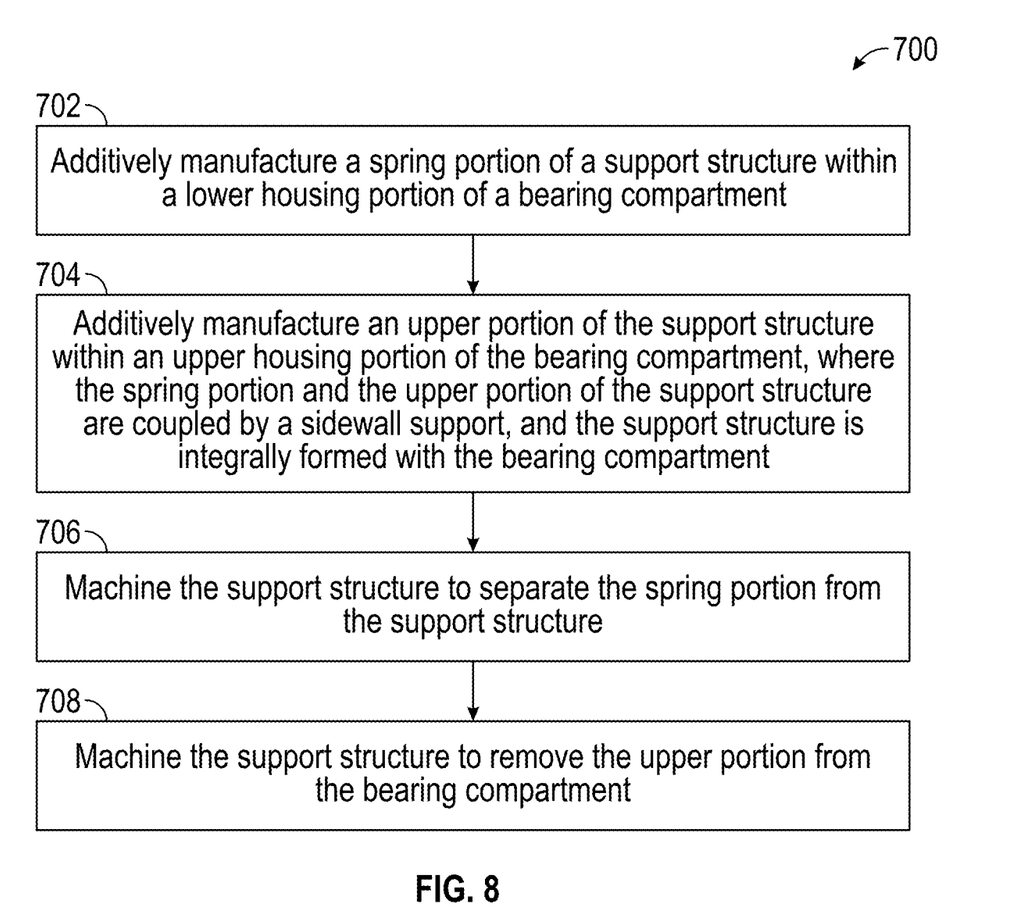
FIG. 8 is a flow diagram illustrating a method of manufacturing a bearing compartment in accordance with embodiments.

With reference to FIG. 8, a method 700 of manufacturing a bearing compartment, such as the bearing compartment 202 described above, is provided. At block 702, the method 700 includes additively manufacturing a spring portion 222 of a support structure 220 within a lower housing portion 232 of a bearing compartment 202. At block 704, the method 700 includes additively manufacturing an upper portion 224 of the support structure 220 within an upper housing portion 234 of the bearing compartment 202, where the spring portion 222 and the upper portion 224 of the support structure 220 are coupled by a sidewall support 225, and the support structure 220 is integrally formed with the bearing compartment 202. At block 706, the method 700 includes machining the support structure 220 to separate the spring portion 222 from the support structure 220. At block 708, the method 700 includes machining the support structure 220 to remove the upper portion 234 from the bearing compartment 202.

In some embodiments, the spring portion 222 is additively manufactured as a squirrel cage spring. In some embodiments, the spring portion 222 includes a shell with an internal lattice structure 400 within the struts 282. The shell can include one of more weep holes 604 that allow additive manufacturing powder to be removed from within the internal lattice structure 400, and the internal lattice structure 400 can be a triply periodic minimal surfaces structure comprising a gyroid. In some embodiments, two or more of the struts 282 are canted and may taper to a central portion 304. In some embodiments, the spring portion 222 includes one or more features configured to be machined away to tune spring performance of the spring portion 222. The spring portion 222 and the upper portion 224 of the support structure 220 can be coupled by a sidewall support 225. The support structure 220 can be integrally formed with the bearing compartment 202. The upper portion 224 of the support structure 220 can include a plurality of support struts 284 that provide an inner support for the upper housing portion 234.

Benefits of the features described herein include a spring portion formed integrally with a support structure in a bearing compartment through additive manufacturing that allows for complex geometries. Further, the spring portion can be separated from the support structure as the support structure is machined away. This makes an otherwise sacrificial component used during the build process available to incorporate as a component of the bearing compartment for use within a gas turbine engine.

The term "about" is intended to include the degree of error associated with measurement of the particular quantity based upon the equipment available at the time of filing the application. Terms such as "upper" and "lower" are used for purposes of explanation and the designation as such can be altered depending upon component orientation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing compartment comprising:
    a housing comprising an upper housing portion and a lower housing portion; and
    a support structure fabricated within the bearing compartment, wherein the support structure comprises an upper portion within the upper housing portion and a spring section within the lower housing portion, and wherein the spring section comprises a plurality of struts and is separable from the support structure for use as a spring within the housing.

2. The bearing compartment of claim 1, wherein the spring portion is a squirrel cage spring.

3. The bearing compartment of claim 1, wherein the spring portion comprises a shell with an internal lattice structure within the struts.

4. The bearing compartment of claim 3, wherein the shell comprises one of more weep holes that allow additive manufacturing powder to be removed from within the internal lattice structure.

5. The bearing compartment of claim 4, wherein the internal lattice structure is a triply periodic minimal surfaces structure comprising a gyroid.

6. The bearing compartment of claim 1, wherein two or more of the struts are canted.

7. The bearing compartment of claim 1, wherein the spring portion comprises one or more features configured to be machined away to tune spring performance of the spring portion.

8. The bearing compartment of claim 1, wherein the spring portion and the upper portion of the support structure are coupled by a sidewall support.

9. The bearing compartment of claim 1, wherein the support structure is integrally formed with the bearing compartment.

10. The bearing compartment of claim 1, wherein the upper portion of the support structure comprises a plurality of support struts that provide an inner support for the upper housing portion.

11. A method of manufacturing a bearing compartment, the method comprising:
    additively manufacturing a spring portion of a support structure within a lower housing portion of the bearing compartment;
    additively manufacturing an upper portion of the support structure within an upper housing portion of the bearing compartment, where the spring portion and the upper portion of the support structure are coupled by a sidewall support, and the support structure is integrally formed with the bearing compartment;
    machining the support structure to separate the spring portion from the support structure; and
    machining the support structure to remove the upper portion from the bearing compartment.

12. The method of claim 11, wherein the spring portion is a squirrel cage spring.

13. The method of claim 11, wherein the spring portion comprises a shell with an internal lattice structure within the struts.

14. The method of claim 13, wherein the shell comprises one of more weep holes that allow additive manufacturing powder to be removed from within the internal lattice structure.

15. The method of claim 14, wherein the internal lattice structure is a triply periodic minimal surfaces structure comprising a gyroid.

16. The method of claim 11, wherein two or more of the struts are canted.

17. The method of claim 11, wherein the spring portion comprises one or more features configured to be machined away to tune spring performance of the spring portion.

18. The method of claim 11, wherein the spring portion and the upper portion of the support structure are coupled by a sidewall support.

19. The method of claim 11, wherein the support structure is integrally formed with the bearing compartment.

20. The method of claim 11, wherein the upper portion of the support structure comprises a plurality of support struts that provide an inner support for the upper housing portion.

* * * * *